UNITED STATES PATENT OFFICE.

ELIAS HELLER, OF LOS ANGELES, CALIFORNIA.

YEAST COMPOSITION AND METHOD OF MAKING SAME.

1,177,323.  Specification of Letters Patent.  Patented Mar. 28, 1916.

No Drawing.  Application filed February 11, 1915.  Serial No. 7,521.

*To all whom it may concern:*

Be it known that I, ELIAS HELLER, a subject of Nicolas II, Czar of Russia, residing in the city of Los Angeles and State of California, have invented a new and useful Yeast Composition and Method of Making Same, of which the following is a specification.

My composition consists of the following ingredients, combined in the proportions stated, viz:

| | | |
|---|---|---|
| Water | 1 | gallon. |
| Hops | 2 | ounces. |
| Figs | 4 | ounces. |
| Raisins | 4 | ounces. |
| Malt | 8 | ounces. |
| Flour | 1½ | pounds. |
| Yeast | 3 | ounces. |
| Corn flour | 4 | pounds. |
| Wheat bran | 1½ | pounds. |

The process of making the composition of matter to be known as dry yeast for baking from the ingredients above specified is as follows, viz:—Place the water, hops, figs, raisins and malt into a pan, put the pan upon the fire, and boil until about half a gallon of the mixture remains in the pan. Strain the mixture through a suitable strainer to remove the hulls, seeds, and the like, and again heat the liquid to boiling. As soon as the mixture boils, add the flour, mix thoroughly by agitation for several minutes, then put into a cool place, and allow the mixture to remain until cold. Add the yeast, mixed with a sufficient amount of warm water to produce a milky liquid and put the said mixture into a warm place for 24 hours, thus allowing it to ferment sufficiently. Add the corn flour and wheat bran and knead the mixture into a firm dough, rolling it until one half inch thick, cut it into medium size pieces, put the said pieces in a warm place allowing each side an equal opportunity to dry by turning them from one side to another, at frequent intervals, for a period of eight (8) days and then the product is ready for use.

The method of using or applying this dry yeast for baking is as follows, to wit: For twelve (12) pounds of flour take one and a half ounces of my product, put it in warm water and leave it for an hour to soften; add two (2) pounds of flour and make a loose sponge dough of it; put it in a warm place for three or four hours; then add the remaining ten (10) pounds of flour, knead the mixture into a dough, leave for two (2) hours, knead the dough once more, leave it for another hour and then the finished dough is ready for the oven.

My yeast product need not be kept on ice and may be kept in any reasonable temperature for any length of time without losing its qualities or effect upon the dough; it is healthier as it contains the elements of only pure and healthy products; it is more economical for the reason that it is stronger and a smaller quantity of my yeast product is necessary to produce a larger quantity of dough. The dough made with my yeast tastes better as some of the constituent elements of this composition, not only assist in fermentation of the dough, but also flavor it, and it is a new and essential improvement over all the yeasts for baking now in existence.

I claim:—

1. The herein described composition of matter, containing the dry reaction products of water, hops, figs, raisins, malt, flour, yeast, corn flour, wheat bran, substantially as described and for the purpose specified.

2. The herein described composition of matter containing the dry reaction products of water one gallon, hops two ounces, figs four ounces, raisins four ounces, malt eight ounces, flour one and a half pounds, yeast three ounces, corn flour four pounds, wheat bran one and a half pounds, substantially as described.

3. A process of making a yeast product suitable for bread raising which comprises boiling a mixture containing water, hops, figs, raisins, and malt, straining the liquid, adding flour thereto, agitating and cooling, adding yeast and maintaining the mixture at a temperature at which said yeast will act, adding corn flour and wheat bran and mixing the mass, and thereafter drying the mixture at a temperature below that which would injure the yeast.

4. A process of making a yeast compound which comprises boiling a mixture of 1 gallon of water, 2 ounces of hops, 4 ounces of figs, four ounces of raisins, and 8 ounces of malt, until about half a gallon of the mixture remains, straining the mixture, adding 1½ pounds of flour to the liquid while at a boiling temperature, and thoroughly mixing the same, cooling to a temperature below that at which yeast would be destroyed, and adding 3 ounces of yeast, and allowing the mass to ferment for about 24 hours, adding 4 pounds of corn flour and 1½ pounds of wheat bran, kneading the mixture into a dough, and drying the same at a temperature too low to injure the yeast, substantially as described.

ELIAS HELLER.

Witnesses:
CHAIM SHAPIRO,
BERNHARD WARSHAW.